United States Patent
Gruden et al.

(10) Patent No.: US 6,659,082 B1
(45) Date of Patent: Dec. 9, 2003

(54) METHOD FOR OPERATING A FOUR-STROKE INTERNAL COMBUSTION ENGINE

(75) Inventors: Igor Gruden, Leonberg (DE); Rolf-Guenther Nieberding, Stuttgart (DE); Guido Vent, Speyer (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/601,742
(22) PCT Filed: Jan. 16, 1999
(86) PCT No.: PCT/EP99/00227
§ 371 (c)(1), (2), (4) Date: Sep. 18, 2000
(87) PCT Pub. No.: WO99/40296
PCT Pub. Date: Aug. 12, 1999

(30) Foreign Application Priority Data

Feb. 7, 1998 (DE) .......................................... 198 04 988

(51) Int. Cl.⁷ ............................................... F02D 41/14
(52) U.S. Cl. .................................. 123/435; 123/568.14
(58) Field of Search ......................... 123/27 R, 435, 123/305, 568.14

(56) References Cited

U.S. PATENT DOCUMENTS 4,621,603 A    11/1986   Matekunas ................. 123/425
5,724,927 A    3/1998    Suzuki ..................... 123/90.15
6,230,683 B1 * 5/2001    zur Loye et al. ............ 123/435

FOREIGN PATENT DOCUMENTS

| EP | 0 352 861   | 1/1990  |
| EP | 0 686 759   | 12/1995 |
| JP | 8-296463    | 11/1996 |
| WO | WO 98/07973 | 2/1998  |

OTHER PUBLICATIONS

Schwerpunkt–Kriterium und automatische Klingelerkennung; Von Michael Bargende; MTZ Motortechnische Zeitschrift 56 (1995); pp. 632–638.

* cited by examiner

Primary Examiner—Andrew M. Dolinar
(74) Attorney, Agent, or Firm—Crowell & Moring LLP

(57) ABSTRACT

In a method for operating a four-stroke internal combustion engine with a homogeneous, lean basic mixture of air and fuel and with compression ignition, the fuel/air ratio formed in the combustion space is variable by means of a controllable inlet member. In order to achieve as rapid adaptation as possible to varied combustion sequences, a measurement of the respective combustion is carried out and the time of closing of the inlet member of the combustion space is regulated, for a next successive cycle, as a function of the signal obtained from this measurement.

8 Claims, 1 Drawing Sheet

METHOD FOR OPERATING A FOUR-STROKE INTERNAL COMBUSTION ENGINE

BACKGROUND AND SUMMARY OF THE INVENTION

This application claims the priority of PCT International Application No. PCT/EP99/00227, filed Jan. 16, 1999 (16.01.99) and German patent document 198 04 988.9, filed Feb. 7, 1998 (07.02.98), the disclosures of which is expressly incorporated by reference herein.

The invention relates to a method for operating a four-stroke internal combustion engine.

Internal combustion engines which operate on the principle of compression ignition of homogeneous lean air/fuel mixtures, offer the possibility of achieving low nitrogen oxide formation and high thermal efficiency. However, these advantages arise only within a narrow operating range which is defined by rapidly changing prevailing conditions.

During compression ignition, the air/fuel mixture is brought to ignition by means of compression heat. After the start of ignition, a self-accelerating combustion process is caused by the energy released initially. Compression which is too low leads to delayed, incomplete combustion, whilst compression which is too high leads to inadmissibly steep pressure rises and to gas oscillations in the combustion space (knocking).

European patent document EP 0 709 562 A2 describes a method for controlling the valve characteristics and the fuel/air mixture of an internal combustion engine. The inlet valves assigned to a cylinder are can be coupled as necessary, so that the fuel/air mixture can optionally be sucked in through one or two inlet valves. The mixture rate can thereby be varied between a lower limit value with a relatively lean mixture and an upper limit value with a relatively rich mixture.

DE-A 195 19 663 discloses a method for operating an internal combustion engine with compression ignition, in which a homogeneous and lean air/fuel mixture produced by external mixture formation is first compressed to near to the ignition limit. In a second step, an additional quantity of the same fuel is finely atomized and is injected into the combustion space, avoiding contact with the wall. The fuel injected late forms a mixture cloud which ignites, because its ignition limit is below the compression temperature reached in the first step, due to the higher fuel content.

EP 0 352 861 A describes a method for operating a four-stroke internal combustion piston engine. The method comprises storing a number of values for determining the various inlet and outlet valve operating times, and the monitoring of a number of existing engine operating characteristics. The value which is most suitable for the existing operating characteristics is selected, and the valve is activated at the time determined by the selected value. In this case, an electronically controlled valve-operated device is activated. The method comprises selectively changing the values on the basis of engine operating experience and, at the same time, using a self-adapting engine control computer. In this case, activation involves a single selective opening and closing of both of the inlet valve and the outlet valve during each complete piston return, only when the engine speed is above a predetermined value. The engine is then operated as a two-stroke engine, using the same inlet and outlet valves as in four-stroke operation.

One object of the invention is to provide a method of the type described previously, which makes it possible for the mixture formation to be adapted quickly to a desired combustion process.

This and other objects and advantages are achieved by the method according to the invention, for operating a four-stroke internal combustion engine with a homogenous, lean basic mixture of air and fuel, utilizing the principle of compression ignition. In the method according to the invention, the fuel/air ratio formed in the combustion space is variable by means of a controllable inlet member. In order to achieve as rapid adaptation as possible to varied combustion sequences, a measurement of the respective combustion is carried out and the time of closing of the inlet member of the combustion space is regulated, for a next successive cycle, as a function of the signal obtained form this measurement.

As a result of the rapid setting of the control times and injection times for each individual combustion space, fluctuations in boundary conditions, such as gas temperatures and component temperatures, are compensated, and optimal combustion is thus implemented for each working cycle in the combustion spaces.

A variable valve control system for the inlet control of the combustion space is provided, by means of which the quantity of the fuel/air mass in the combustion space is varied. Within a cycle of the reciprocating-piston engine, the variable valve control system is activated by control electronics, irrespective of the volumetric state of the combustion space.

The aim of regulating the combustion is to bring about maximum compression. This means that, for the given volume function, in the case of a variable initial quantity of air and fuel, the aim is to achieve maximum filling for the combustion space. Filling is limited by undesirable combustion-space pressure increases which occur, and the subsequent combustion-space pressure oscillations. During a combustion cycle, these undesirable combustion and explosion operations can be detected by assessing the electrical conductivity of the mixture or the solid-borne sound emission of the combustion by means of solid-borne sound sensors (ideally, knocking sensors).

This regulating action is made possible by the use of high-speed adaptive electronics employing stored characteristic maps or neuronal networks. In addition to monitoring data which are indicative of combustion, these electronics also take into account the valve control times and the injection timings, as well as the associated air-excess and residual-gas-fraction values. The influence of the surroundings and of the engine state is detected by means of the intake-air temperature and the cooling-water temperature.

Other objects, advantages and novel features of the present invention will become apparent from the following detailed description of the invention when considered in conjunction with the accompanying drawings.

DETAILED DESCRIPTION OF THE DRAWINGS

Figure 1:
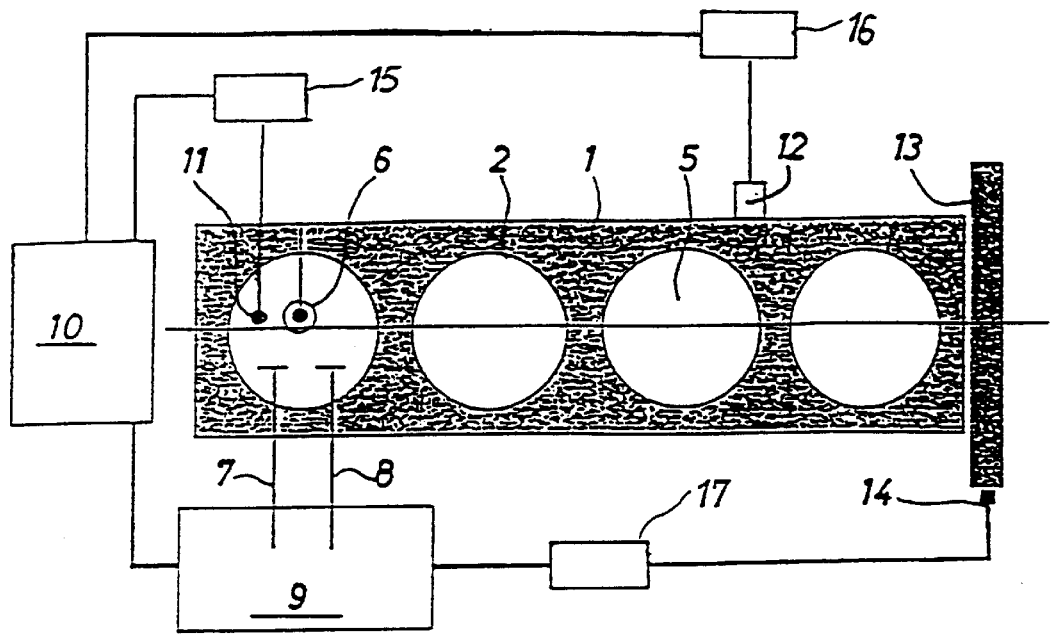
FIG. 1 is a schematic illustration of an internal combustion engine with a control unit and with means for measuring the combustion operation.

The internal combustion engine illustrated diagrammatically in FIG. 1 has a cylinder block 1 with four cylinders 2, in which pistons are guided sealingly and which are closed by means of a cylinder head. The cylinder block 1, piston and cylinder head surround a combustion space 5 in which combustion takes place.

Located in the cylinder head, for each combustion space 5, are a fuel injection valve 6, a gas inlet member 7 and a gas outlet member 8. The gas exchange members 7, 8 are opened and closed by an actuating device 9. A control unit 10 controls the opening and closing of the gas exchange members 7, 8 and of the fuel injection valve 6 continuously.

In each cylinder head there is an ionic-current sensor 11 in the form of a pair of electrical conductors (for example, a spark plug) for measuring the electrical conductivity of the combustion gases. To analyse the combustion, an ionization meter 15 is provided, which is connected to the ionic-current sensor 11 and to the control unit 10. A knocking sensor 12 for measuring the solid-borne sound relevant to combustion is arranged on the cylinder block 1 and is assigned to a solid-borne sound detector 16. Located in the region of a flywheel 13 is a rotational-speed sensor 14 for measuring the rotational non-uniformity of the crankshaft; signals from this sensor are processed in a unit 17 for torque assessment. The ionic-current sensor 11, knocking sensor 12 and rotational-speed sensor 14 deliver real-time signals relating to the position and profile of combustion for the control unit 10.

Figure 2:
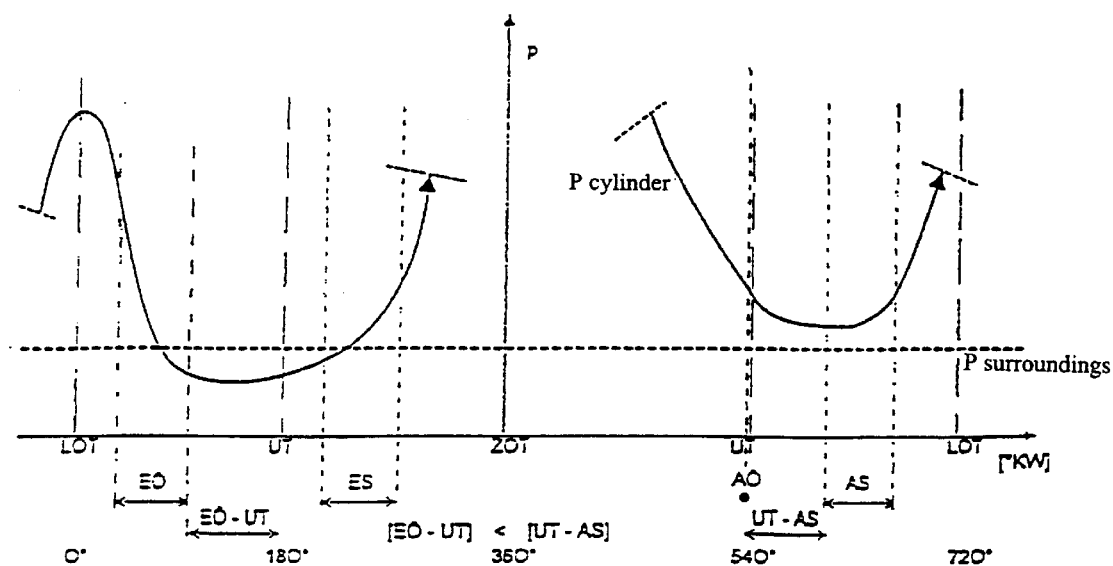
FIG. 2 is a cylinder pressure graph for gas exchange, together with control times of the gas exchange members.

FIG. 2 shows a cylinder pressure graph with low-pressure curves of the gas exchange and with control-time ranges of the gas exchange members 7, 8. Within the scope of the following functional description of the method according to the invention, three qualitative examples are presented, which show the strategy for adjusting the control times of the gas exchange members 7, 8.

By designing an internal combustion engine with variable effective compression (for example, by means of the free activation of the inlet and outlet members 7, 8 for the continuous variation of the working-space volume), variable compression can be combined with mixture formation. Exhaust gas is retained in the combustion space 5 in order to influence the next combustion operation.

In order to prevent knocking combustion by means of variable effective compression, it is necessary to have quick-reacting gas exchange members 7, 8 and fuel injection valves 6 which, by being activated freely by means of an electronic control unit 10, vary the filling of the individual combustion spaces 5 from work cycle to work cycle.

The strategy of this combustion regulation is aimed at maximum, knock-free compression, that is, at the maximum possible filling of the combustion spaces 5. Combustion is measured or represented in real time (in terms of position and profile) by means of the ionic- current sensor 11 and/or the knocking sensor 12 and/or the rotational-speed sensor 14 and is assessed by the control logics of the control unit 10. The regulating comparison of the current values established and their profile as a function of time with the combustion phenomena is evaluated by the control logics which are based on the technology of neuronal networks. The air/fuel ratio, the intake-air temperature and the engine rotational speed are also used as additional input parameters for training the logics network. Recognition takes place by comparison of "good" combustion with undesirable combustion. Control may also be carried out via values stored in characteristic maps, instead of by means of neuronal networks.

For measuring the electrical conductivity of the combustion gas, a voltage is applied to a pair of electric conductors in the combustion space and the current flux is monitored during combustion by means of this pair of conductors. During combustion, the combustion position and the type of combustion are determined via the qualitative and quantitive profile of the current flux. That is, an occurrence of undesirable combustion phenomena is recognized.

Upon recognition of an undesirable combustion cycle in a particular cylinder by means of the combustion monitoring described above, the effective compression is reduced for the next cycle in the same cylinder, by a reduction in the air and fuel quantity supplied, just until undesirable combustion behaviour is no longer exhibited.

In order to lower effective compression, the intake phase is not fully utilized; that is, the inlet member closes before bottom dead centre is reached. After the closing of the inlet member, a vacuum is generated in the combustion space 5 and assists mixture formation, specifically in the case of internal mixture formation.

For ignition of the fresh mixture, its temperature must be brought to the minimum value necessary. The temperature increase can be brought about by geometric compression or by the intermixing of the cold fresh gas with heat and exhaust gas. The exhaust-gas outflow quantity can be influenced by the variable control of the outlet member.

The quantity of exhaust gas which is retained in the combustion space can be by means of the same control. The expansion phase of the internal combustion engine lasts until bottom dead centre of the piston travel, to ensure optimum efficiency. The outlet member opens at the start of the exhaust stroke. The opening time of the outlet member 8 can also be optimized by virtue of gas-dynamic effects dependent on the rotational speed.

As a result of the excess pressure in the combustion space 5, the exhaust gas is conveyed out of the latter. (Excess pressure in the combustion space 5 occurs due to the residual pressure of combustion and due to the reduction in the combustion-space volume during the exhaust stroke.) During the exhaust stroke, the outlet member 8 is closed again, so that the is exhaust gas in the combustion space is not exhausted completely, but is compressed again. The temperature of the residual gas is increased at the same time.

The regulation of the opening time of the inlet member 7 serves to optimize the mixture formation in terms of the current temperature conditions of non-steady state operation. During the intake stroke, the inlet member 7 opens at the time when the pressure in the combustion space 5 has fallen below the pressure level of the surroundings. In the case of earlier inlet opening, the exhaust-gas stream enters the intake line in an undesirable way. During the intake stroke, the inlet member 7 is always opened after the piston passes through the position which it assumed during the exhaust stroke when the outlet member 8 was closing.

During the intake stroke, new charge mass is sucked into the combustion space as a result of the pressure difference which is established. The closing time of the outlet member 8 determines the residual-gas quantity, and therefore the amount of mixture mass which can be sucked in with the next intake stroke. The composition of the mixture of air and fuel determines the energy content of the mixture mass sucked in during the next cycle. For optimizing the efficiency of an internal combustion engine operating with a constant load, the mixture composition should be kept constant in a first approximation. The variation in the mixture quantity sucked in is obtained from the given compression conditions and the residual-gas fractions. Any compensation of load changes which may be necessary can be carried out by means of the injected fuel quantity in the case of both internal and external mixture formation.

In order to have sufficient time for mixture intake, the inlet member 7 must be opened sufficiently long. The time delay in the opening of the inlet member 7 in relation to the end of residual-gas expansion shortens the time remaining for the inflow of the charge, but increases the vacuum in the combustion space 5, and consequently the inflow velocity of the fresh mixture. This leads to good intermixing of the air/fuel mixture with the hot residual gas of the preceding combustion cycle.

A disadvantage of the increased vacuum in the combustion space 5 is that its gas mass is cooled. Against this cooling there is the advantage of improved mixture formation due to the increased flow velocity. Better mixture formation reduces the average individual volume of the exhaust-gas fraction. With increasingly finer intermixing, the surface/volume ratio of the exhaust-gas becomes so low that heat conduction increasingly lowers the maximum temperature of the residual gas. The maximum temperature in the exhaust-gas volume determines the ignition performance of the surrounding fresh mixture during compression.

The control times of the inlet member 7 must be optimized as a function of the mixture temperature, residual-gas temperature and of the composition of the air/fuel mixture. This can be carried out using values stored in characteristic maps or by means of the technology of neuronal networks. When the engine is cold, high flow velocities, along with the resulting good mixture formation, are more important than the filling losses associated therewith. At the same time, the cooling-water temperature is taken into account as a further regulating variable.

The inlet swirl due to asymmetric inflow conditions offers a further degree of freedom for optimizing the mixture formation. The time-staggered activation of two independently activatable inlet members 7 can be used for optimization of slight variations during operation.

The time profile of the electrical conductivity of the combustion gases can be used for continuous optimization of the combustion position during a stable and steady combustion operation. In this case, the activation times of the inlet members 7 are varied slightly, and their effects on the combustion position and the operating behaviour are checked. If an improvement occurs, the changed control times for the given surrounding conditions are stored.

The following cases, as qualitative examples of control-time setting, are described with reference to FIG. 2:

Case of low load, lean air/fuel mixture:
  Outlet closing: early—only a little exhaust gas is discharged from the combustion space 5.
  Inlet opening: late—long expansion due to the large exhaust-gas quantity, which is hot as a result of compression and is over-expanded, leads to good intermixing of the fresh gas in the exhaust gas.
  Inlet closing: late—lean mixture needs high compression for ignition.

Case of high load, richer air/fuel mixture:
  Outlet closing: late—a large amount of exhaust gas has to be replaced by fresh mixture.
  Inlet opening: early—the large quantity of inflowing fresh gas ensures good intermixing.
  Inlet closing: early—rich mixture ignites more easily and combustion should not be transferred into undesirable regions because of compression which is too high.

Case of increasing rotational speed:
  Outlet closing: tends to be later, since, with an increasing rotational speed, the wall heat loss decreases, the compression operation leads to a higher gas temperature and less residual gas is necessary.
  Inlet opening: tends to be earlier, since a higher gas velocity and rotational speed lead to sufficiently good intermixing.
  Inlet closing: tends to be later, in order to compensate the reaction time, decreasing with the rotational speed, by means of a longer intake and compression time and a higher final compression temperature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a four-stroke internal combustion engine with a homogeneous lean basic air-fuel mixture, and with compression ignition, said engine having a variable valve operating system for controlling a flow of gases into and out of a combustion space via an inlet valve and an outlet valve, said method comprising:

sensing at least one parameter indicative of combustion in a current cycle of said engine;

generating real time signals indicative of position and-profile of combustion of said internal combustion engine as a function of sensed parameter values;

detecting undesirable operation of said internal combustion engine;

in response to the position and profile of combustion, regulating a time of closing of said inlet valve for a next following cycle of said engine to eliminate said undesirable operation, by determining a residual gas fraction to be retained in said combustion space for said next following combustion cycle based on said sensed parameter values;

using an adaptive controller to adjust a closing time for said outlet valve to implement said determined residual gas fraction for the next following cycle of the engine; and determining an opening time for the inlet valve in response to required conditions for mixture formation within the combustion space.

2. The method according to claim 1, further comprising:

in response to a signal indicative of engine knocking operation, lowering effective compression for a next following combustion cycle in a cylinder in which knocking was detected.

3. The method according to claim 1, wherein the at least one parameter further comprises at least one actual engine parameter selected from the group consisting of ionic current in the combustion space and rotational non-uniformity of the crankshaft.

4. The method according to claim 1, wherein:

said detecting step comprises recognizing desirable and undesirable combustion regions by means of control logic contained in a control unit, based on one of parameters stored in characteristic maps and pattern recognition by means of neuronal networks or adaptive controllers; and said method further comprises using measured engine parameters, determining desired operational values for the inlet and outlet valves and for fuel injection valve, to optimize combustion.

5. The method according to claim 4, wherein the desired operational values are determined in the control unit taking into account at least one of the following engine actual values:
- solid-borne sound values from knocking sensors;
- ionic-current values from ionic-current sensors;
- engine rotational speed and its profile;
- valve control times;
- injection timings;
- air excess and residual-gas fraction;
- intake-air temperature; and
- cooling-water temperature.

6. The method according to claim 1, wherein the respective temperature of the exhaust-gas fraction and therefore the start of combustion in the next cycle are determined by means of mixture formation via a surface/volume ratio.

7. The method according to claim 1, wherein combustion is optimized by a variation in compression, turbulence and injection.

8. A method for operating a four-stroke internal combustion engine with a homogeneous lean basic air-fuel mixture, and with compression ignition, said engine having a variable valve operating system for controlling a flow of gases into and out of a combustion space via an inlet valve and an outlet valve, said method comprising:
- measuring electrical conductivity of a gas mixture in said combustion space during a current cycle of said engine;
- determining a combustion state of said engine in said cycle via an ionization meter;
- determining in real time a residual gas fraction to be retained in said combustion space for a next following cycle of said engine as a function of said combustion state; and
- using an adaptive controller to adjust a closing time for said outlet valve to a point which provides said determined residual gas fraction for the next following cycle of the engine.

* * * * *